US012537149B2

(12) United States Patent
Saito et al.

(10) Patent No.: US 12,537,149 B2
(45) Date of Patent: Jan. 27, 2026

(54) INPUT DEVICE

(71) Applicant: ALPS ALPINE CO., LTD., Tokyo (JP)

(72) Inventors: Akizumi Saito, Tokyo (JP); Hiroshi Ohara, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 246 days.

(21) Appl. No.: 18/535,098

(22) Filed: Dec. 11, 2023

(65) Prior Publication Data

US 2024/0136128 A1 Apr. 25, 2024
US 2024/0234051 A9 Jul. 11, 2024

Related U.S. Application Data

(63) Continuation of application No. PCT/JP2022/024839, filed on Jun. 22, 2022.

(30) Foreign Application Priority Data

Jun. 25, 2021 (JP) ................................. 2021-105457

(51) Int. Cl.
*H01H 13/52* (2006.01)
*H01H 13/14* (2006.01)
*H01H 13/38* (2006.01)

(52) U.S. Cl.
CPC ............ *H01H 13/52* (2013.01); *H01H 13/14* (2013.01); *H01H 13/38* (2013.01)

(58) Field of Classification Search
CPC ........ H01H 13/52; H01H 13/14; H01H 13/38; H01H 2215/004; H01H 13/48;
(Continued)

(56) References Cited

U.S. PATENT DOCUMENTS 11,430,618 B2 * 8/2022 Ohara .................... H01H 13/14
11,934,621 B2 * 3/2024 Takizawa .............. H01H 13/52
(Continued)

FOREIGN PATENT DOCUMENTS

JP 3179036 U 10/2012
JP 2018-160318 10/2018
WO 2021/010064 1/2021

OTHER PUBLICATIONS

International Search Report for PCT/JP2022/024839 mailed on Sep. 6, 2022.

*Primary Examiner* — Lheiren Mae A Caroc
(74) *Attorney, Agent, or Firm* — IPUSA, PLLC

(57) ABSTRACT

An input device includes a housing; an invertible spring provided inside the housing; a load sensor arranged alongside the invertible spring inside the housing; a stem extending across a top portion of the invertible spring and the load sensor, and configured to push both the top portion of the invertible spring and the load sensor in response to an operating load applied to the stem; and a first fixed contact provided inside the housing, wherein the stem is a conductive member, and in response to the operating load applied to the stem, the stem pushes both the top portion of the invertible spring and the load sensor, and also comes into contact with the first fixed contact so that the first fixed contact is energized via the stem.

14 Claims, 16 Drawing Sheets

(58) Field of Classification Search
CPC ............ H01H 13/85; H01H 5/04; H01H 5/18; H01H 5/30; H01H 13/26; H01H 13/36
See application file for complete search history.

(56) References Cited

U.S. PATENT DOCUMENTS

| | | | | |
|---|---|---|---|---|
| 12,094,665 | B2 * | 9/2024 | Ohara .................... | H01H 13/48 |
| 12,154,731 | B2 * | 11/2024 | Ohara .................... | H01H 13/66 |
| 2022/0155903 | A1 | 5/2022 | Saito et al. | |

* cited by examiner

INPUT DEVICE

CROSS-REFERENCE TO RELATED APPLICATION

The present application is a continuation application of International Application No. PCT/JP2022/024839, filed Jun. 22, 2022, which claims priority to Japanese Patent Application No. 2021-105457 filed Jun. 25, 2021. The contents of these applications are incorporated herein by reference in their entirety.

BACKGROUND OF THE INVENTION

1. Field of the Invention

The disclosures herein relate to an input device.

2. Description of the Related Art

Japanese Utility Model Registration No. 3179036 discloses a push switch configured such that when an operating member is pushed, a movable contact member becomes inverted by the pushing of the operating member, thereby imparting a clicking operation sensation. The movable contact portion in turn comes into contact with a first fixed contact portion. By doing so, an electrical connection is established between the first fixed contact portion and a second fixed contact portion.

However, since the push switch disclosed in Japanese Utility Model Registration No. 3179036 can merely perform switching between on and off by the pushing operation, the push switch is unable to perform various types of detection of the pushing operation.

SUMMARY OF THE INVENTION

According to one aspect of the present disclosure, there is provided an input device including:

- a housing;
- an invertible spring provided inside the housing;
- a load sensor arranged alongside the invertible spring inside the housing;
- a stem extending across a top portion of the invertible spring and the load sensor, and configured to push both the top portion of the invertible spring and the load sensor in response to an operating load applied to the stem; and
- a first fixed contact provided inside the housing,
- wherein the stem is a conductive member, and in response to the operating load applied to the stem, the stem pushes both the top portion of the invertible spring and the load sensor, and also comes into contact with the first fixed contact so that the first fixed contact is energized via the stem.

According to one aspect of the present disclosure according to the input device, a clicking operation sensation can be imparted in response to the pushing operation and various detections of the pushing operation can be performed with a relatively simple configuration.

DESCRIPTION OF THE PREFERRED EMBODIMENT

Below, an embodiment is described with reference to the drawings. In the following description, for the sake of convenience, the horizontal direction is defined as both the X-axis direction and the Y-axis direction, and the vertical direction (up-down direction) is defined as the Z-axis direction. It is to be noted that the positive side of the Z axis is defined as the upper side, whereas the negative side of the Z axis is defined as the lower side. Further, the positive side of the X axis is defined as the front side, whereas the negative side of the X axis is the rear side. Further, the positive side of the Y axis is the right side, whereas the negative side of Y axis is the left side.

(Overview of Input Device 100)

Figure 1:
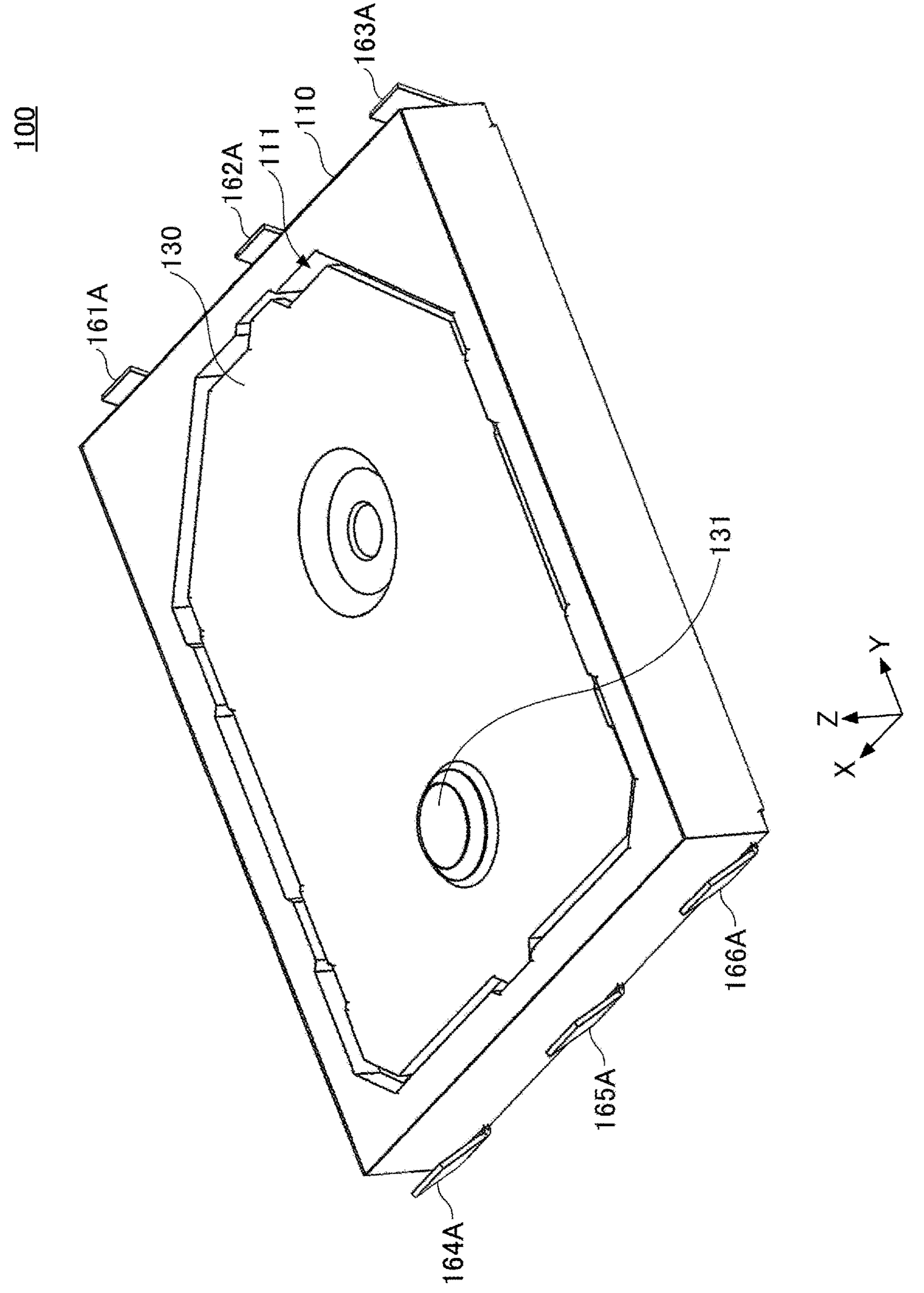
FIG. 1 is an external perspective view of an input device according to an embodiment.
Figure 2:
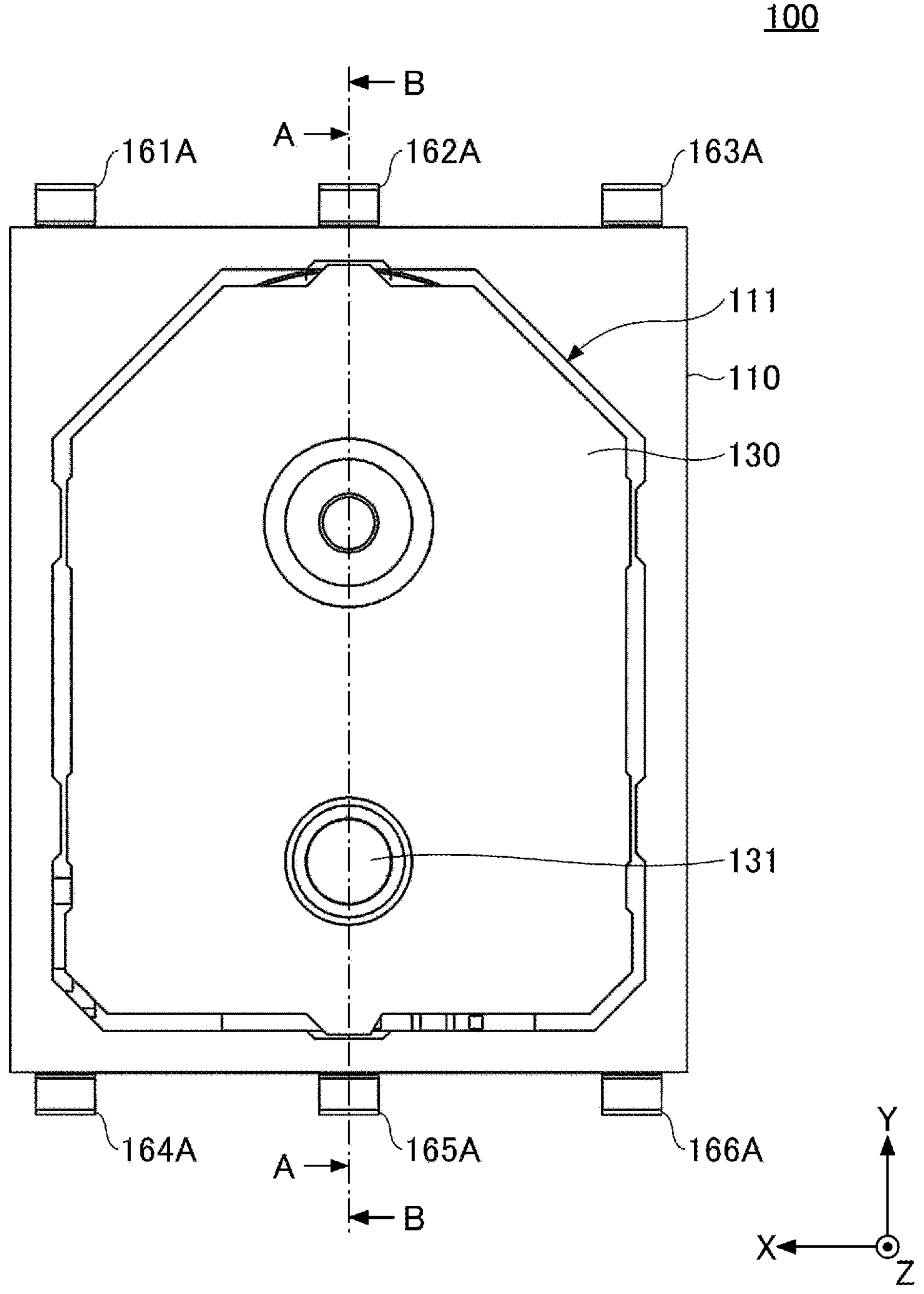
FIG. 2 is a plan view of the input device according to the embodiment.

FIG. 1 is an external perspective view of an input device 100 according to an embodiment. FIG. 2 is a plan view of the input device 100 according to the embodiment. The input device 100 illustrated in FIG. 1 and FIG. 2 is a thin-type push-operable input device 100 that is used in various types of electronic devices and the like. As illustrated in FIG. 1 and FIG. 2, a flat plate-shaped stem 130 is disposed in a first recessed portion 111 of a housing 110 of the input device 100, and when a pushing operation is performed on an operating portion 131 of the stem 130, the stem 130 can push both a top portion 120A of an invertible spring 120 and a pushing portion 151 of a pressure sensor 150 (an example of a "load sensor") that are provided in the first recessed portion 111 of the housing 110. By pushing the top portion 120A of the invertible spring 120, the input device 100 can invert the 13 invertible spring 120 to impart a clicking sensation in response to the pushing operation, and also can perform a switching operation such that an external connection terminal 162A becomes electrically connected (that is, in a switched-on state) with an external connection terminal 164A. In addition, the input device 100 can detect an operating load of the pushing operation by the pushing of the pushing portion 151 of the pressure sensor 150 and can output a detection signal indicating the detected operating load, from four external connection terminals 161A, 163A, 165A, and 166A that are connected to the pressure sensor 150.

(Configuration of Input Device 100)

Figure 3:
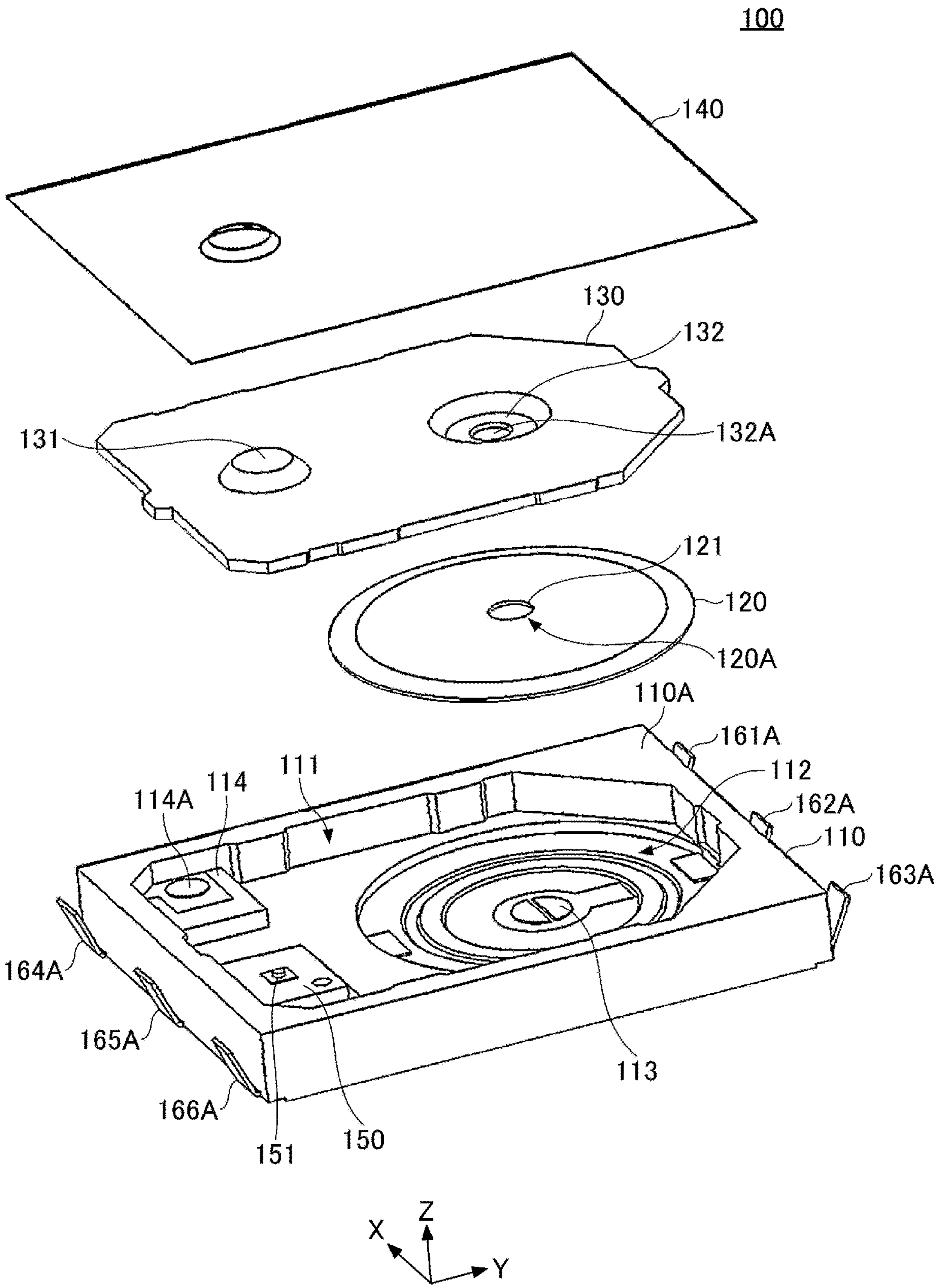
FIG. 3 is an exploded perspective view of the input device according to the embodiment.
Figure 4:
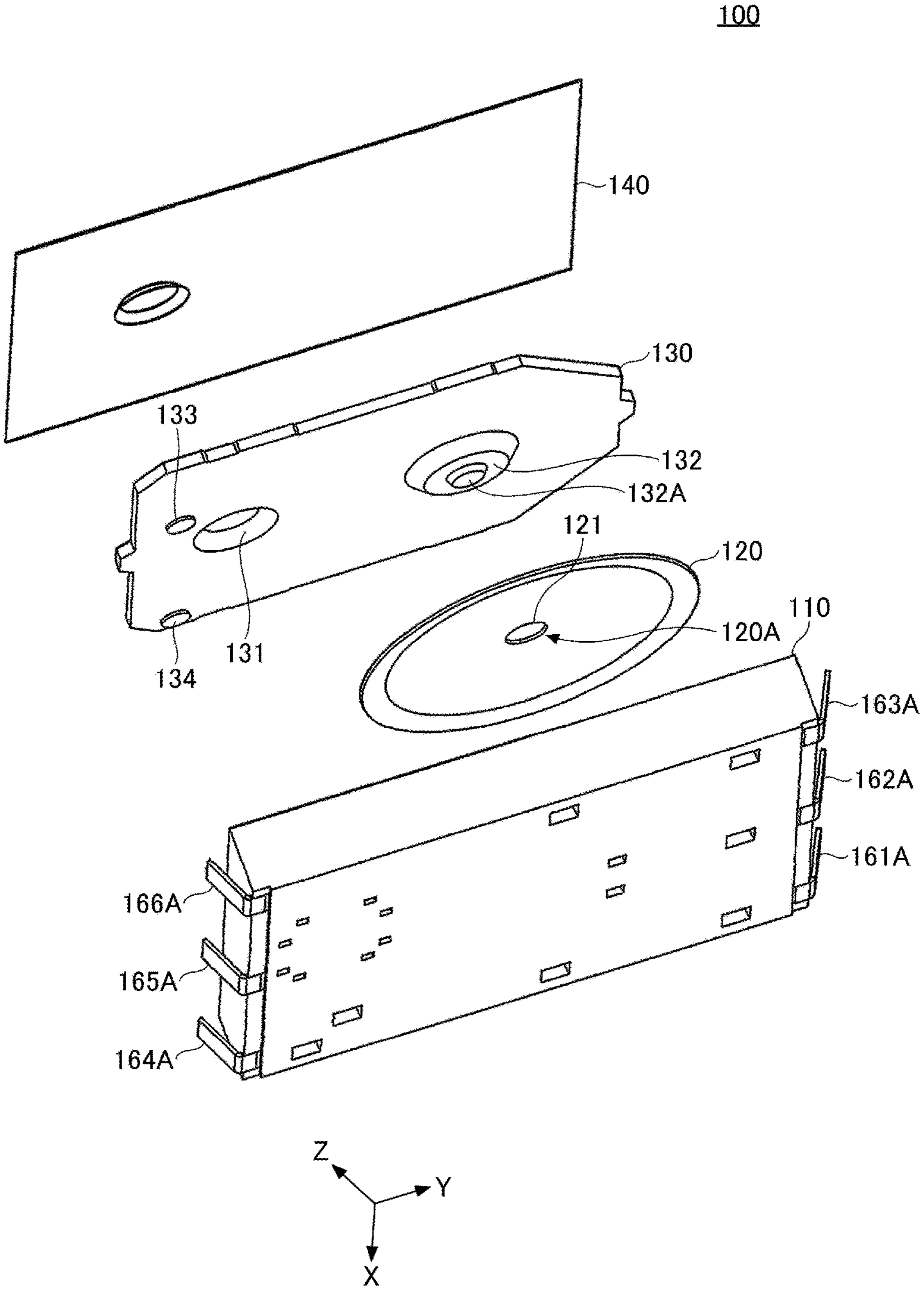
FIG. 4 is another exploded perspective view of the input device according to the embodiment.
Figure 5:
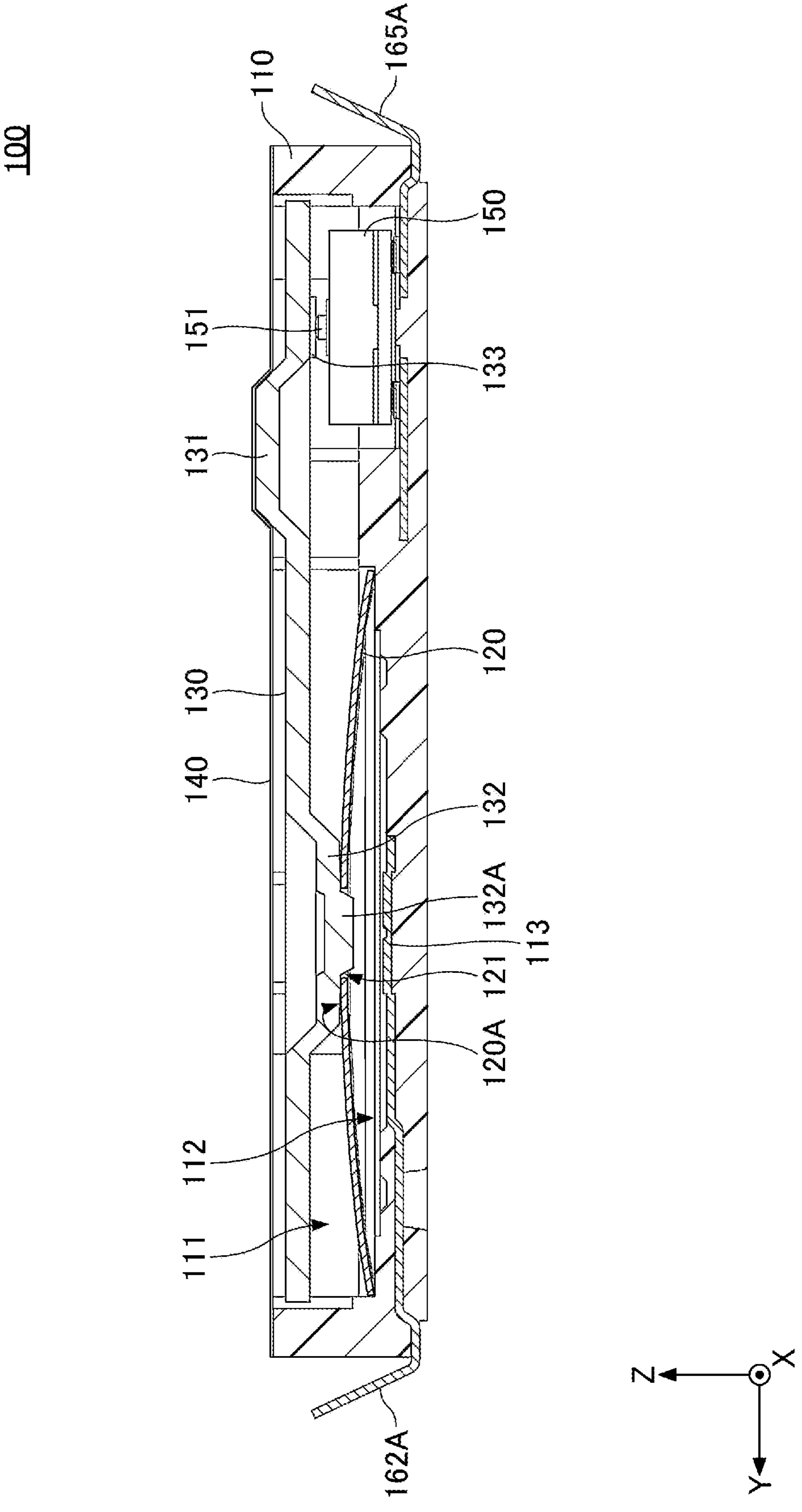
FIG. 5 is a cross-sectional view taken along A-A cross-sectional line (see FIG. 2) of the input device according to the embodiment.
Figure 6:
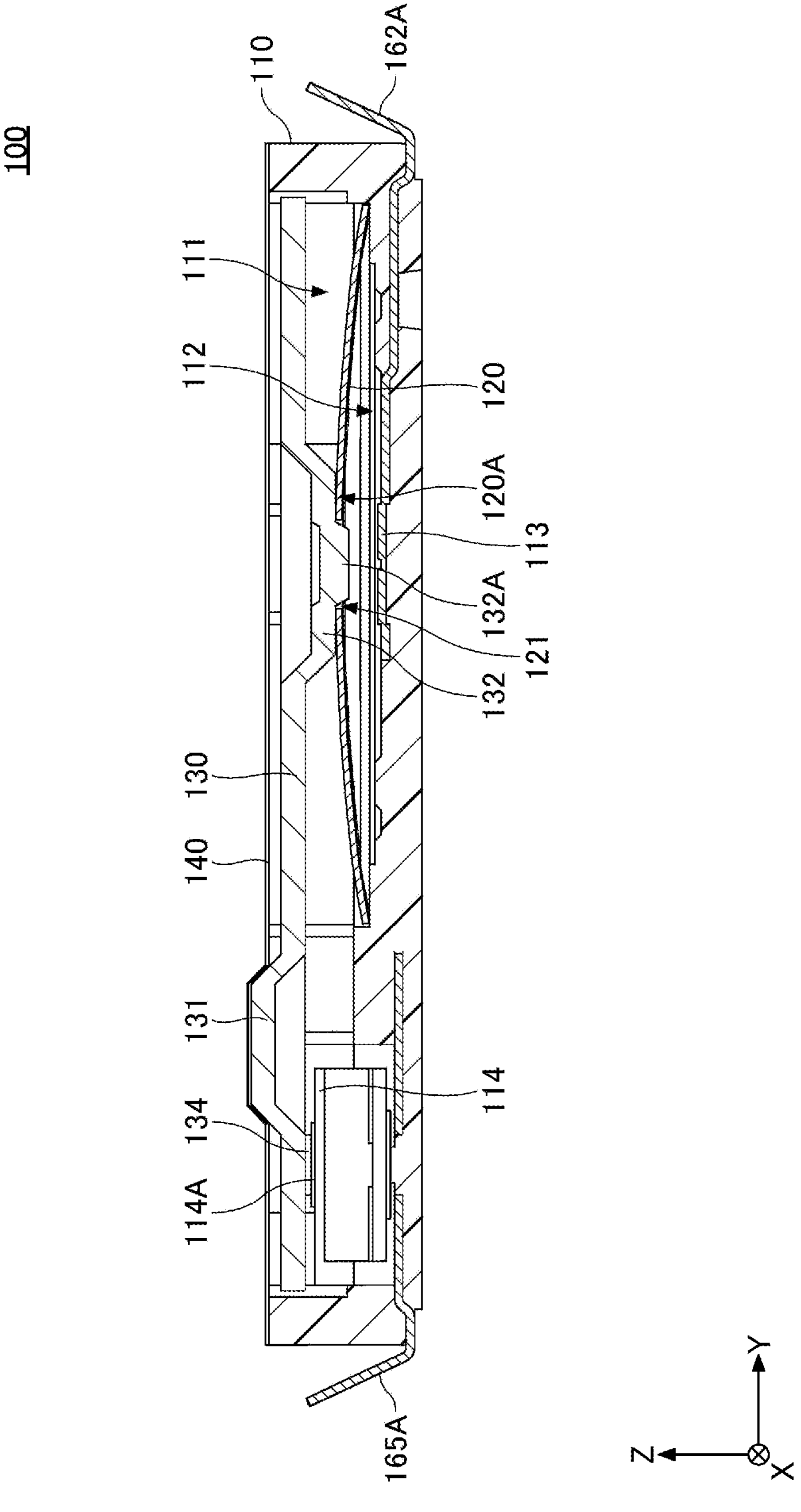
FIG. 6 is a cross-sectional view taken along B-B cross-sectional line (see FIG. 2) of the input device according to the embodiment.

FIG. 3 and FIG. 4 are exploded perspective views of the input device 100 according to the embodiment. FIG. 5 is a cross-sectional view taken along A-A cross-sectional line (see FIG. 2) of the input device 100 according to the embodiment. FIG. 6 is a cross-sectional view taken along B-B cross-sectional line (see FIG. 2) of the input device 100 according to the embodiment.

As illustrated in FIG. 2 to FIG. 6, the input device 100 includes the housing 110, the invertible spring 120, the stem 130, and an insulator 140.

The housing 110 is a resin container-like member having a thin rectangular parallelepiped shape in the up-down direction (Z-axis direction) and having a horizontally long rectangular shape with the left-right direction (Y-axis direction) as a lengthwise direction in a plan view as viewed from above (positive side in the Z-axis direction). The housing 110 has the first recessed portion 111 that is formed in a shape that is recessed downward from a top surface 110A. The first recessed portion 111 has a generally horizontally-long rectangular shape in a plan view as viewed from above (positive side in the Z-axis direction).

The inner bottom surface on the right side (positive side in the Y-axis direction) of the first recessed portion 111 is formed so as to have a second recessed portion 112 formed in a shape that is further recessed downward. The second recessed portion 112 has a circular shape in a plan view as viewed from above (positive side in the Z-axis direction). The invertible spring 120 is disposed in the second recessed portion 112. A first fixed contact 113 is provided at the center of the inner bottom surface of the second recessed portion 112.

A support 114 is provided at a bottom on the left side (negative side of the Y axis) and the front side (positive side of the X axis) of the first recessed portion 111. The support 114 has a second fixed contact 114A that is made of metal and has a disc shape. A top surface of the second fixed contact 114A of the support 114 supports a fulcrum portion 134 provided on a rear surface of the stem 130. The height position of the second fixed contact 114A of the support 114 is raised from the inner bottom surface of the first recessed portion 111 so that the stem 130 can be horizontally supported by the top surface of the second fixed contact 114A.

Four third fixed contacts 115A to 115D (see FIG. 7) are provided alongside each other on the bottom on the left side (negative side of the Y axis) and the rear side (negative side of the X axis) of first recessed portion 111, and the pressure sensor 150 is disposed on the four third fixed contacts 115A to 115D. The pressure sensor 150 is electrically connected to each of the four third fixed contacts 115A to 115D. The pressure sensor 150 has the pushing portion 151 that has an upward-protruding shape. When the pushing portion 151 is pushed, the pressure sensor 150 can detect an operating load caused by this pushing.

The invertible spring 120 is a dome-shaped member formed of a thin-metal plate and having convex shape that protrudes upward (positive Z-axis direction). The invertible spring 120 has a circular shape in a plan view as viewed from above (positive side of the Z axis). The invertible spring 120 has a dome shape and the center portion of the invertible spring 120 (that is, the center of the circle) is the top portion 120A. An opening 121 that is circularly shaped in a plan view as viewed from above (positive side of the Z axis) is formed at the top portion 120A of the invertible spring 120.

The invertible spring 120 is disposed in the second recessed portion 112 of the housing 110. The top portion 120A of the invertible spring 120 is pushed downward by the operating portion 131 of the stem 130 in response to a pushing operation performed on the stem 130, and once the load exceeds a predetermined operating load, the top portion 120A rapidly elastically deforms (inverting operation) into a recessed shape. By doing so, the invertible spring 120 can impart a clicking sensation in response to the pushing operation. Further, the invertible spring 120 returns to its original convex shape by elastic force in response to the pushing force from the stem 130 being removed.

The stem 130 is a flat metal member that has conductivity. The stem 130 has substantially the same shape (that is, a generally horizontally-long rectangular shape) as that of the first recessed portion 111 of the housing 110 in a plan view as viewed from above (positive side of the Z axis). The stem 130 is disposed in the first recessed portion 111 of the housing 110 and extends across the top portion 120A of the invertible spring 120 and the pushing portion 151 of the pressure sensor 150.

The stem 130 has the operating portion 131, a first pushing portion 132, a second pushing portion 133, and the fulcrum portion 134.

The operating portion 131 is formed on the top surface of the stem 130 (at a position offset to the left side in the Y-axis direction (the negative side of the Y axis) and at the center in the X-axis direction), and has a truncated cone shape protruding upward (in the positive direction of the Z axis). The operating portion 131 is a component to which the operating load of the pushing operation is applied from above.

The first pushing portion 132 is provided on the rear surface of the stem 130 at a position (a position offset to the right side in the Y-axis direction (positive side of the Y axis) and at the center in the X-axis direction) facing the top portion 120A of the invertible spring 120, and has a truncated cone shape protruding downward (in the negative direction of the Z axis). The first pushing portion 132 pushes the top portion 120A of the invertible spring 120. A protrusion 132A that further protrudes downward is provided at the center of the bottom end surface of the first pushing portion 132. The protrusion 132A enters the opening 121 of the invertible spring 120. The bottom end surface of the protrusion 132A protrudes slightly downward from the opening 121. Thus, the bottom end surface of the protrusion 132A can be brought into contact with the first fixed contact 113 when the invertible spring 120 becomes inverted.

The second pushing portion 133 is provided on the rear surface of the stem 130 at a position (a position offset to the left side in the Y-axis direction (negative side of the Y axis) and at a position offset to rear side in the X-axis direction (negative side of the X axis) facing the pushing portion 151 of the pressure sensor 150 that is provided in the housing 110, and is a disc-shaped portion protruding downward (in the negative direction of the Z axis). The second pushing portion 133 pushes the pushing portion 151 of the pressure sensor 150.

The fulcrum portion 134 is provided on the rear surface of the stem 130 at a position (a position offset to the left side in the Y-axis direction (negative side of the Y axis) and at a position offset to the front side in the X-axis direction (positive side of the X axis) facing the support 114 that is provided in the housing 110, and is a disc-shaped portion protruding downward (in the negative direction of the Z axis). The fulcrum portion 134 is supported by the support 114 provided in the housing 110 and serves as the fulcrum when the stem 130 is tilted by the pushing operation.

The insulator 140 is a transparent, thin film-shaped component. The insulator 140 has a horizontally-long rectangular shape similar to the top surface 110A of the housing 110 in a plan view as viewed from above (positive side of the Z axis). The insulator 140 is affixed (for example, laser welded) to the top surface 110A (portion around the first recessed portion 111) of the housing 110 such that the entirety of the top surface 110A of the housing 110 is covered. The insulator 140 seals the first recessed portion 111 of the housing 110, thereby preventing water from entering inside the first recessed portion 111 of the housing 110.

(Configuration of Fixed Contact Members)

Figure 7:
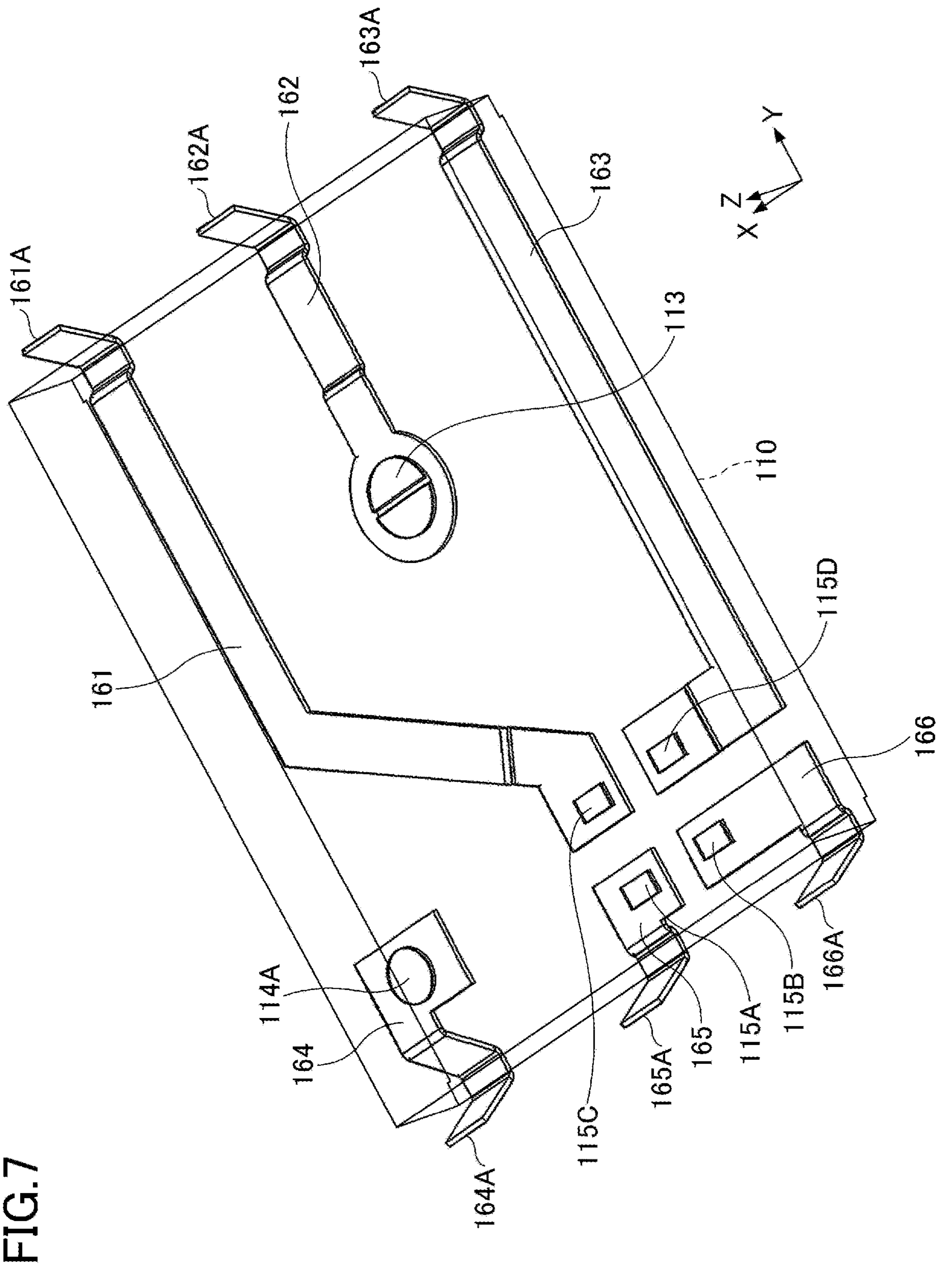
FIG. 7 is a diagram illustrating a configuration of multiple fixed contact members included in the housing according to the embodiment.

FIG. 7 is a diagram illustrating a configuration of multiple fixed contact members included in the housing 110 according to the embodiment. As illustrated in FIG. 7, the housing 110 is provided with six fixed contact members 161 to 166. The six fixed contact members 161 to 166 are integrally formed with the housing 110 by insert molding. Each of the fixed contact members is formed by using a metal plate that has conductivity.

Thus, three external connection terminals 161A, 162A, and 163A are provided on the housing 110 so as to protrude outward from the right side surface (side surface on the positive side of the Y axis) of the housing 110, and three external connection terminals 164A, 165A, and 166A are provided on the housing 110 so as to protrude outward from the left side surface (side surface on the negative side of the Y axis) of the housing 110.

The fixed contact member 161 has an external connection terminal 161A on one end thereof and a third fixed contact 115C on the other end thereof. The pressure sensor 150 is connected to the third fixed contact 115C.

The fixed contact member 162 has the external connection terminal 162A on one end thereof and the first fixed contact 113 on the other end thereof. When a pushing operation of the stem 130 is performed, the bottom end surface of the protrusion 132A of the stem 130 comes into contact with the first fixed contact 113.

The fixed contact member 163 has the external connection terminal 163A on one end thereof and a third fixed contact 115D on the other end thereof. The pressure sensor 150 is connected to the third fixed contact 115D.

The fixed contact member 164 has the external connection terminal 164A on one end thereof and the second fixed contact 114A on the other end thereof. The second fixed contact 114A is electrically connected to the stem 130 and supports the stem 130.

The fixed contact member 165 has the external connection terminal 165A on one end thereof and the third fixed contact 115A on the other end thereof. The pressure sensor 150 is connected to the third fixed contact 115A.

The fixed contact member 166 has the external connection terminal 166A on one end thereof and the third fixed contact 115B on the other end thereof. The pressure sensor 150 is connected to the third fixed contact 115B.

(Operations of Input Device 100)

In the input device 100 according to the embodiment, when a pushing operation is performed on the operating portion 131 of the stem 130, the stem 130 is tilted downward on the fulcrum portion 134 and the pushing portion 151 of the pressure sensor 150 acting as fulcrums, so that the second pushing portion 133 of the stem 130 pushes the pushing portion 151 of the pressure sensor 150 while the first pushing portion 132 of the stem 130 pushes the top portion 120A of the invertible spring 120.

By doing so, the input device 100 according to the embodiment can detect an operating load of the pushing operation in real time by the pressure sensor 150.

Also, once the operating load of the pushing operation exceeds a predetermined threshold, the top portion 120A of the invertible spring 120 rapidly performs an inverting operation. By doing so, the input device 100 according to the embodiment can impart a clicking sensation in response to the pushing operation.

Also, when the invertible spring 120 becomes inverted, the bottom end surface of the protrusion 132A of the stem 130 comes into contact with the first fixed contact 113. By doing so, the input device 100 according to the embodiment can perform a switching operation such that the first fixed contact 113 and the external connection terminal 162A become electrically connected (that is, in a switched-on state) with the second fixed contact 114A and the external connection terminal 164A, via the stem 130.

Further, in the input device 100 according to the embodiment, when the pushing operation on the operating portion 131 of the stem 130 is ceased, the invertible spring 120 returns to its original convex shape owing to the elastic force of the invertible spring 120. By doing so, the bottom end surface of the protrusion 132A of the stem 130 ceases being in contact with first fixed contact 113. As a result, the input device 100 according to the embodiment can perform a switching operation such that the first fixed contact 113 and the external connection terminal 162A cease being electrically connected (that is, enter a switched-off state) with the second fixed contact 114A and the external connection terminal 164A.

Therefore, according to the input device 100 of the embodiment, a clicking operation sensation can be imparted in response to the pushing operation and various detections (detection of a switching between the on state and the off state, and detection of an operating load) of the pushing operation can be performed with a relatively simple configuration.

(Operating Position, Pushing Position, and Fulcrum Position of Stem 130)

Figure 8:
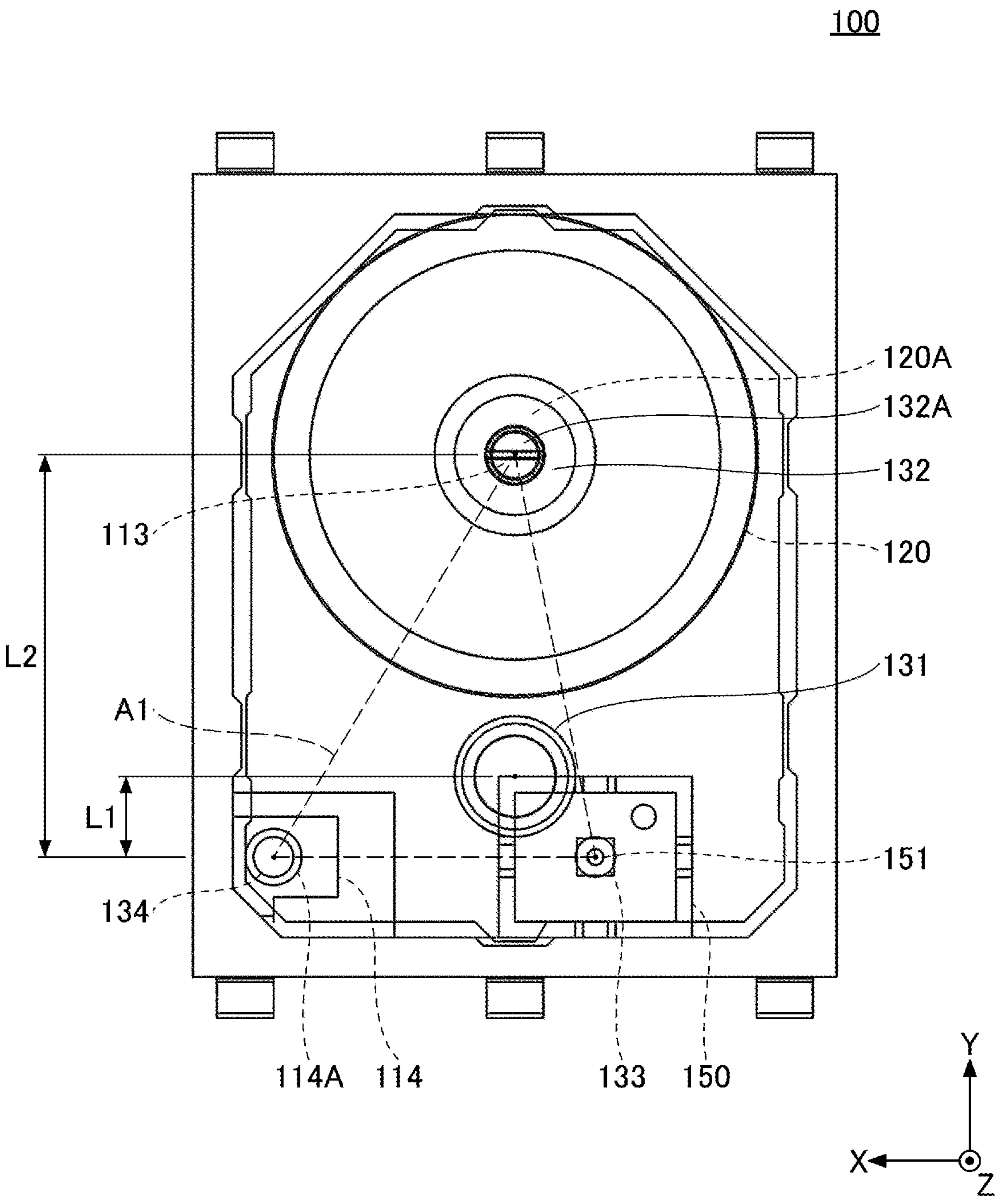
FIG. 8 is a diagram illustrating the operating position, pushing position, and a fulcrum position of a stem according to the embodiment.

FIG. 8 is a diagram illustrating an operating position, a pushing position, and a fulcrum position of the stem 130 according to the embodiment.

As illustrated in FIG. 8, the stem 130 has the protrusion 132A that passes through the opening 121 of the invertible spring 120 and comes into contact with the first fixed contact 113, in response to the invertible spring 120 becoming inverted.

By doing so, the input device 100 according to the embodiment enables the stem 130 to be used as part of an on-off switching switch, and thus an on-off switching switch can be achieved by a relatively simple configuration.

Also, the input device 100 according to the embodiment can achieve an electrical connection by simply bringing the protrusion 132A and the first fixed contact 113 into contact with each other without the inverted contact of the invertible spring 120, and thus the input device 100 can ensure prolonged, stable switching operations.

Also, as illustrated in FIG. 8, the stem 130 includes the operating portion 131 to which the operating load is applied.

By doing so, the input device 100 according to the embodiment can clarify the position of the stem 130 to which the operating load is to be applied, and thus a predetermined operating load of the pushing operation can be obtained.

Also, as illustrated in FIG. 8, the support 114 (that is, the fulcrum position) that supports the stem 130 is provided in the housing 110. In response to an operating load applied to the operating portion 131, the stem 130 tilts on the support 114 (and the second pushing portion 133) acting as a fulcrum, and thus the first pushing portion 132 (that is, the first pushing position) can push the top portion 120A of the invertible spring 120.

By doing so, when the operating load is applied to the operating portion 131, the input device 100 according to the embodiment can easily push the top portion 120A of the invertible spring 120 and the pushing portion 151 of the pressure sensor 150 by the stem 130.

In particular, as illustrated in FIG. 8, the operating portion 131 (that is, the operating position) of the stem 130 is provided between the top portion 120A of the invertible spring 120 and the support 114 in a first direction (Y-axis direction) in which the top portion 120A of the invertible spring 120 and the support 114 are arranged. By doing so, the input device 100 according to the embodiment can increase the operating load of the pushing operation, as compared to a case in which the operating portion 131 is provided on the top portion 120A of the invertible spring 120. Further, the input device 100 according the embodiment can increase the operating load of the pushing operation while suppressing spring force of the invertible spring 120 itself, and thus input device 100 can extend the life of the invertible spring 120.

For example, in the example illustrated in FIG. 8, the ratio of a first distance L1 from the support 114 to the operating portion 131 to a second distance L2 from the support 114 to the first pushing portion 132 is 1:5 in the Y-axis direction. In this case, the input device 100 according to the embodiment can increase the operating load of the pushing operation five-fold, as compared to the case in which the operating portion 131 is provided on the top portion 120A of the invertible spring 120.

Also, the input device 100 according to the embodiment can freely adjust the operating load of the pushing operation by adjusting the position of the operating portion 131 to adjust the ratio of the first distance L1 to the second distance L2.

The support 114 has the second fixed contact 114A to which the stem 130 is always connected. In response to the operating load applied to the operating portion 131, the protrusion 132A of the stem 130 also contacts with the first fixed contact 113, thereby energizing the first fixed contact 113 with the second fixed contact 114A, via the stem 130.

By doing so, the input device 100 according to the embodiment enables the stem 130 and the second fixed contact 114A to be used as part of an on-off switching switch, and thus an on-off switching switch can be achieved by a relatively simple configuration.

Further, as illustrated in FIG. 8, when the stem 130 is viewed in a plan view, the operating portion 131 of the stem 130 is within a triangular region A1 demarcated by positions of the first pushing portion 132 that pushes the top portion 120A of the invertible spring 120, the second pushing portion 133 that pushes the pushing portion 151 of the pressure sensor 150, and the fulcrum portion 134 that is supported by the support 114.

By doing so, the input device 100 according to the embodiment can stably support the stem 130 at three points and can improve the operating load of the pushing operation.

(Example of Operating Load Characteristics)

Figure 9:
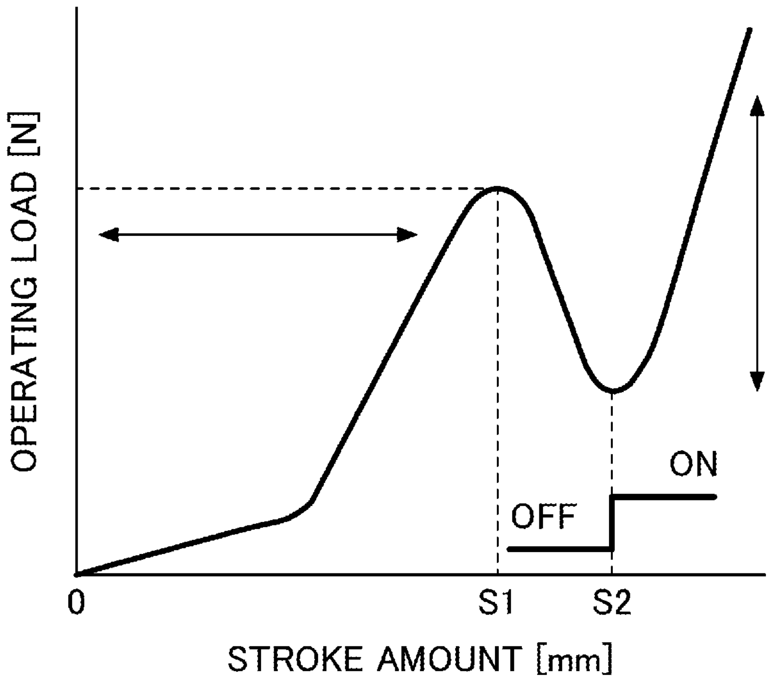
FIG. 9 is a diagram illustrating an example of operating load characteristics of the input device according to the embodiment.

FIG. 9 is a diagram illustrating an example of the operating load characteristics of the input device 100 according to the embodiment. FIG. 9 is a graph illustrating operating load characteristics (FS curve) of the input device 100 according to the embodiment with the vertical axis representing the operating load [N] of the pushing operation and the horizontal axis representing the stroke amount [mm] of the pushing operation. The operating load characteristics illustrated in FIG. 9 are generated by the invertible spring 120.

As illustrated in FIG. 9, after the pushing operation by the operating portion 131 is started, the operating load according to the pushing operating by the operating portion 131 gradually increases as the invertible spring 120 is pushed and elastically deforms, until the stroke amount of the pushing operation reaches a stroke amount S1 at which the inverting operation of the invertible spring 120 starts. Therefore, as illustrated in FIG. 9, the operating load according to the pushing operation by the operating portion 131 becomes the maximum load when the stroke amount of the pushing operation is the stroke amount S1.

Thereafter, the operating load according to the pushing operation performed by the operating portion 131 rapidly decreases as the invertible spring 120 performs the inverting operation, until the stroke amount of the pushing operation reaches the stroke amount S2 at which the inverting operation of the invertible spring 120 ends. Thus, the input device 100 according to the embodiment can impart a clicking sensation in response to the pushing operation.

In addition, in the input device 100 according to the embodiment, when the stroke amount of the pushing operation becomes the stroke amount S2, the lower end surface of the protrusion 132A of the stem 130 comes into contact with the first fixed contact 113. By doing so, the input device 100 according to the embodiment can perform a switching operation such that the first fixed contact 113 and the external connection terminal 162A become electrically connected (that is, in a switched-on state) with the second fixed contact 114A and the external connection terminal 164A, via the stem 130.

Thereafter, since the pushing operation by the operating portion 131 compresses the invertible spring 120, the operating load according to the pushing operation by the operating portion 131 gradually increases until the stroke amount of the pushing operation reaches a maximum stroke amount S3.

The input device 100 according to the embodiment can detect operating loads that change in accordance with such stroke amounts in real time by the pressure sensor 150.

(Overview of Input Device 200)

Figure 10:
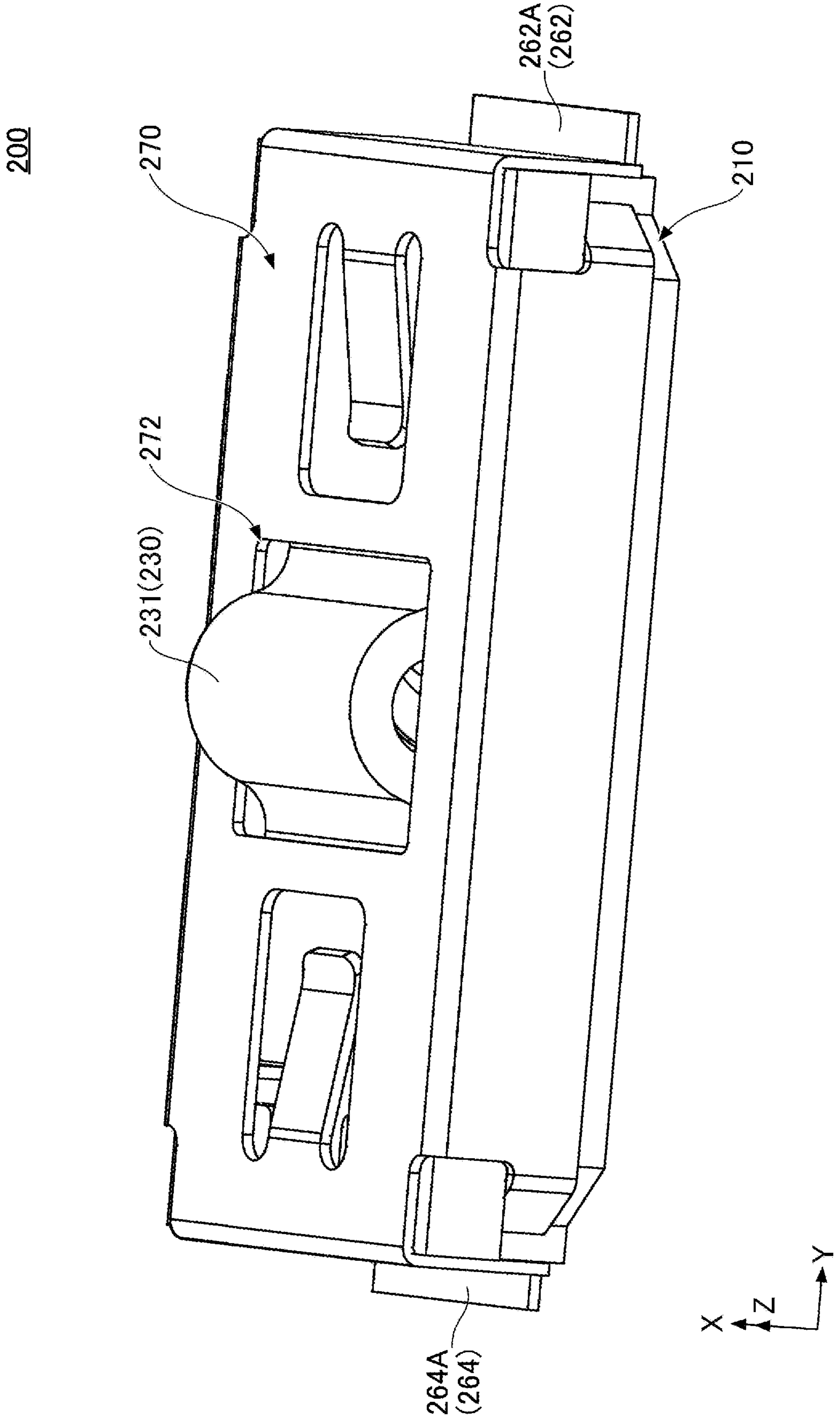
FIG. 10 is an external perspective view of an input device according to another embodiment.

FIG. 10 is an external perspective view of an input device 200 according to another embodiment. The input device 200 illustrated in FIG. 10 is a thin-type push-operable input device that is used in various types of electronic devices and the like. As illustrated in FIG. 10, when a housing 210 and a cover member 270 are combined together, the input device 200 has a substantially rectangular parallelepiped shape in which the X-axis direction is the widthwise direction and the Y-axis direction is the lengthwise direction.

A flat-shaped stem 230 of the input device 200 is disposed in a first recessed portion 211 of the housing 210 of the input device 200. An operating portion 231 of the stem 230 protrudes upward from an opening 272 of the cover member 270. When a pushing operation is performed on the operating portion 231 of the stem 230, the input device 200 can push both a top portion 220A of an invertible spring 220 provided in a first accommodating area 212 of the housing 210 and a pushing portion 251 of a pressure sensor 250 (an example of a "load sensor") provided in a second accommodating area 213 of the housing 210 by the stem 230.

By pushing the top portion 220A of the invertible spring 220, the input device 200 can invert the invertible spring 220 to impart a clicking sensation in response to the pushing operation, and also can perform a switching operation such that an external connection terminal 262A of a first fixed contact member 262 protruding from one end side (positive side of the Y axis) of the housing 210 becomes electrically connected (that is, in a switched-on state) with an external connection terminal 264A of a second fixed contact member 264 protruding from the other end side (negative side of the Y axis) of the housing 210. In addition, the input device 200 can detect an operating load of the pushing operation by the pushing of the pushing portion 251 of the pressure sensor 250 and can output a detection signal indicating the detected operating load, from four external connection terminals 252A, 252B, 252C, and 252D that are provided on a bottom surface 250A of the pressure sensor 250.

(Configuration of Input Device 200)

Figure 11:
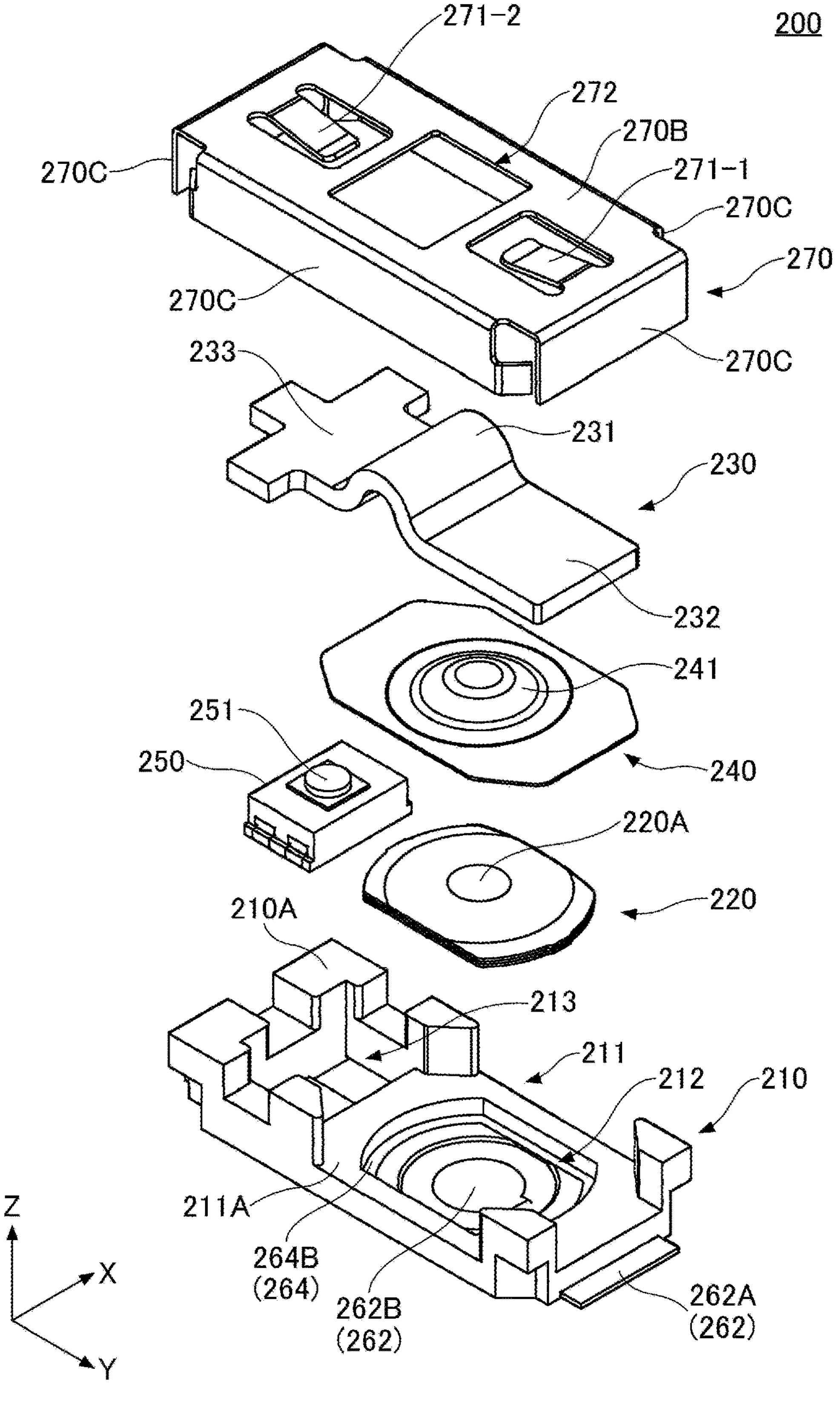
FIG. 11 is an exploded perspective view of the input device according to the other embodiment.
Figure 12:
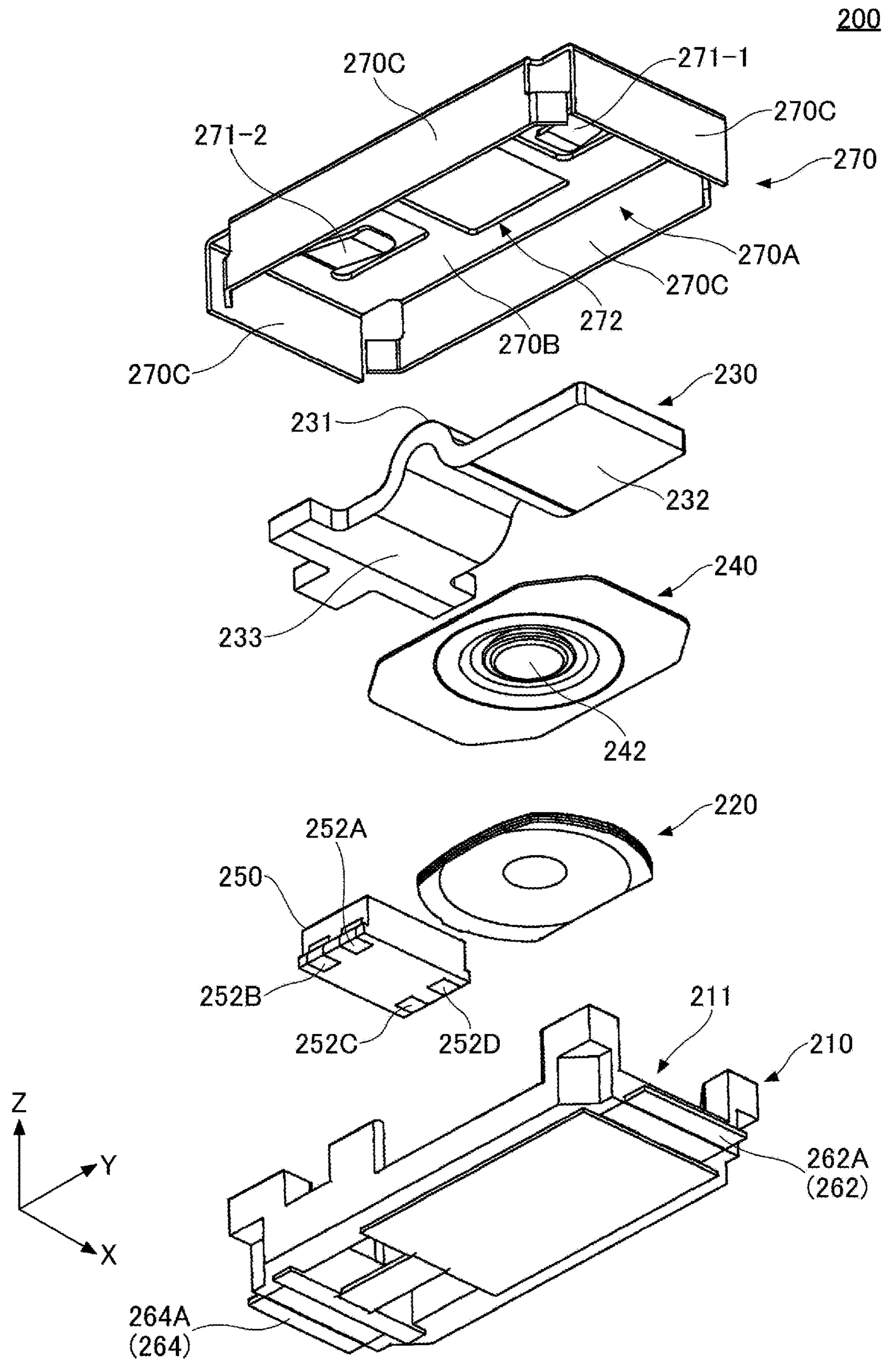
FIG. 12 is another exploded perspective view of the input device according to the other embodiment.
Figure 13:
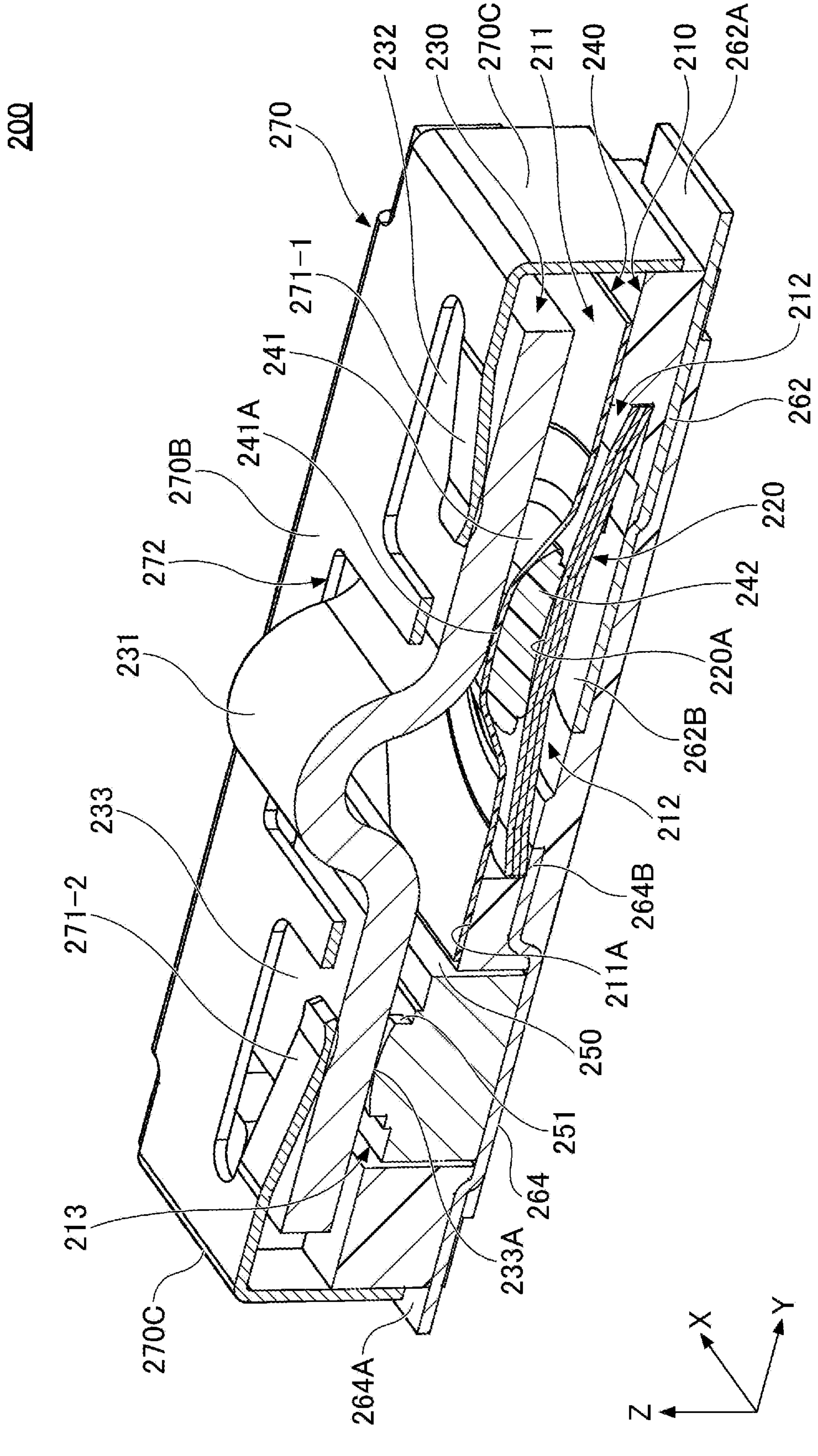
FIG. 13 is a perspective cross-sectional view of the input device according to the other embodiment.

FIG. 11 and FIG. 12 are exploded perspective views of the input device 200 according to the other embodiment. FIG. 13 is an external perspective view of the input device 200 according to the other embodiment.

As illustrated in FIG. 11 to FIG. 13, the input device 200 includes the housing 210, the invertible spring 220, the stem 230, an insulator 240, the pressure sensor 250, and the cover member 270.

The housing 210 is a resin container-like member having a thin rectangular parallelepiped shape in the up-down direction (Z-axis direction) and having a horizontally long rectangular shape with the left-right direction (Y-axis direction) as a lengthwise direction in a plan view as viewed from above (positive side in the Z-axis direction). The housing 210 has the first recessed portion 211 that is formed in a shape that is recessed downward from a top surface 210A. The first recessed portion 211 has a generally horizontally-long rectangular shape in a plan view as viewed from above (positive side in the Z-axis direction).

The first accommodating area 212, formed in a shape that is further recessed downward from a bottom 211A of the first recessed portion 211, is formed on the right side (positive side of the Y axis) of the first recessed portion 211. The first accommodating area 212 has a shape (that is, a shape in which part (both sides in the X-axis direction) of the circle shape is cut) similar to the external shape of the invertible spring 220 in a plan view as viewed from above (positive side of the Z axis). The invertible spring 220 is disposed in the first accommodating area 212. A first fixed contact 262B is provided at the center portion on the bottom of the first accommodating area 212. A second fixed contact 264B is provided at the outer portion on the bottom of the first accommodating area 212.

The second accommodating area 213, formed in a shape that is further recessed downward from the bottom 211A of the first recessed portion 211, is provided on the left side (negative side of the Y axis) of the first recessed portion 211. The second accommodating area 213 has a shape (that is, a rectangular shape) similar to the external shape of the pressure sensor 250 in a plan view as viewed from above (positive side of the Z axis). The pressure sensor 250 is disposed in the second accommodating area 213.

It is to be noted that the first fixed contact member 262 and the second fixed contact member 264 are integrally formed with the housing 210 by insert molding. The first fixed contact member 262 has the external connection terminal 262A on one end thereof and the first fixed contact 262B on the other end thereof. When a pushing operation of the stem 230 is performed, the rear-side portion of the top portion 220A of the invertible spring 220 comes into contact with the first fixed contact 262B. The second fixed contact member 264 includes the external connection terminal 264A on one end thereof and the second fixed contact 264B on the other end thereof. The peripheral edge of the invertible spring 220 is always in contact with the second fixed contact 264B.

The invertible spring 220 is a dome-shaped member that is convex-shaped in the upward direction (in the positive direction of the Z axis) and is formed by using a metal plate that has conductivity. The invertible spring 220 has a shape in which part (both sides in the X-axis direction) of the circle portion thereof is cut in a plan view as viewed from above (positive side of the Z axis). The invertible spring 220 has a dome shape and the center portion of the invertible spring 120 (that is, the center of the circle) is the top portion 220A.

The invertible spring 220 is disposed in the first accommodating area 212 of the housing 210. The top portion 220A gets pushed downward by a first pushing portion 232 of the stem 230 when a pushing operation is performed on the operating portion 231 of the stem 230, and once the operating load exceeds the predetermined operating load, the top portion 220A of the invertible spring 220 rapidly elastically deforms (inverting operation) into a recessed shape. By doing so, the invertible spring 220 can impart a clicking sensation in response to the pushing operation. Further, the invertible spring 220 returns to its original convex shape by elastic force when the pushing force from the stem 230 is removed.

The operating load of the invertible spring 220 can be adjusted by adjusting the number of metal plates. For example, in the present embodiment, the invertible spring 220 is formed by stacking three metal plates. However, the invertible spring 220 is not limited thereto, and as such, the invertible spring 220 may include two or less metal plates, or may include four or more metal plates.

The stem 230 is a flat-shaped member. The stem 230 (that is a generally horizontally-long rectangular shape (elongated shape) has substantially the same shape as the first recessed portion 211 of the housing 210 in a plan view as viewed from above (positive side in the Z-axis direction). The stem 230 is disposed in the first recessed portion 211 of the housing 210 and extends across the top portion 220A of the invertible spring 220 and the pushing portion 251 of the pressure sensor 250.

The stem 230 has the operating portion 231, the first pushing portion 232, and a second pushing portion 233.

The operating portion 231 is formed at the center portion in the lengthwise direction (Y-axis direction) of the stem 230 and has a curved shape that is convex upward (in the positive direction of the Z axis). The operating portion 231 is a component to which the operating load of the pushing operation is applied from above.

The first pushing portion 232 is a flat-shaped portion provided closer to positive-side of the Y axis than the operating portion 231 is. The rear surface of the first pushing portion 232 contacts with a top portion 241A of a bump portion 241 of the insulator 240 on the rear side. Thus, when an operating load of the pushing operation is applied to the operating portion 231, the first pushing portion 232 can push the top portion 220A of the invertible spring 220 via a pushing body 242 that is affixed to the rear side portion of the bump portion 241 of the insulator 240.

The second pushing portion 233 is a flat-shaped portion provided closer to the negative side of the Y axis than the operating portion 231 is. The rear surface of the first pushing portion 232 contacts with the pushing portion 251 of the pressure sensor 250. Thus, when an operating load of the pushing operation is applied to the operating portion 231, the second pushing portion 233 can push the pushing portion 251 of the pressure sensor 250.

The stem 230 is supported from below by both the top portion 241A (and the top portion 220A of the invertible spring 220) of the bump portion 241 of the insulator 240 and the pushing portion 251 of the pressure sensor 250, so that when an operating load of the pushing operation is applied to the operating portion 231, the stem 230 can be tilted downward on a fulcrum 233A (see FIG. 13) that is a point of the stem 230 where the second pushing portion 233 is in contact with the pushing portion 251 (that is, the top portion) of the pressure sensor 250, so that the first pushing portion 232 is positioned lower than the second pushing portion 233 is.

The stem 230 is formed of a hard material so that the stem 230 undergoes hardly any elastic deformation. As a result, an operator can obtain a direct pushing operation sensation of the invertible spring 220 by the pushing operation of the operating portion 231.

Also, since the stem 230 does not need to have conductivity, it may be formed by using either a material having conductivity (for example, a metal material) or a material not having conductivity (for example, a resin material).

The insulator 240 is a thin sheet-shaped member disposed on the bottom 211A of the first recessed portion 211 of the housing 210. The insulator 240 is formed using a resin material such as polyamide (PA) or the like. The insulator 240 is affixed (for example, laser welded) to the bottom 211A (portion around the first accommodating area 212)) of the first recessed portion 211 of the housing 210 so that the entirety of the first accommodating area 212 of the housing 210 is covered. The insulator 240 seals the first accommodating area 212 by closing the upper opening of the first accommodating area 212 of the housing 210. The bump portion 241 that is raised upward (in the positive direction of the Z axis) in a convex shape is formed at the center portion of the insulator 240. As illustrated in FIG. 13, the pushing body 242 is affixed to the rear side portion of the bump portion 241. The pushing body 242 is a resin member that pushes the top portion 220A of the invertible spring 220.

The pressure sensor 250 is disposed under the second pushing portion 233 of the stem 230 in the second accommodating area 213 of the housing 210. The pressure sensor 250 includes the pushing portion 251 that is convex upward. When the pushing portion 251 is pushed by the second pushing portion 233 of the stem 230, the pressure sensor 250 can detect the operating load of the pushing operation of the stem 230. The pressure sensor 250 can output a detected signal indicating the detected operating load, from the four external connection terminals 252A, 252B, 252C, and 252D provided on the bottom surface 250A of the pressure sensor 250.

The cover member 270 is a metal member that covers the top surface 210A of the housing 210. The cover member 270 includes a top wall 270B and four side walls 270C, and has a shape of a rectangular parallelepiped with an opening 270A at the bottom of the cover member 270. The housing 210 is inserted into the cover member 270 through the opening 270A. Thus, the housing 210 is disposed inside the cover member 270. As a result, the cover member 270 covers the top surface 210A of the housing 210 and each of the side surfaces of the housing 210.

Left and right elastic arms 271-1 and 271-2, serving as a pair, are provided on the top wall 270B of the cover member 270. Each of the elastic arms 271-1 and 271-2 has an end supported by the top wall 270B, has a tongue-like shape that is inclined downward from the top wall 270B, and is elastically deformable in the up-down direction (Z-axis direction).

The elastic arm 271-1 is provided over the first pushing portion 232 of the stem 230. The tip end of the elastic arm 271-1 pushes the first pushing portion 232 of the stem 230 from above. By doing so, the elastic arm 271-1 presses the first pushing portion 232 of the stem 230 against the top portion 220A of the invertible spring 220.

The elastic arm 271-2 is provided over the second pushing portion 233 of the stem 230. The tip end of the elastic arm 271-2 pushes the second pushing portion 233 of the stem 230 from above. By doing so, the elastic arm 271-2 presses the second pushing portion 233 of the stem 230 against the pushing portion 251 of the pressure sensor 250.

The opening 272 is formed at center of the top wall 270B of the cover member 270. The opening 272 allows the operating portion 231 of the stem 230 to be inserted therethrough, thereby enabling the operating portion 231 of the stem 230 to protrude upward from the top wall 270B of the cover member 270.

It is to be noted that the cover member 270 is machined by a single sheet of metal, and thus the top wall 270B, the four side walls 270C, and the elastic arms 271-1 and 271-2 are formed seamlessly together.

(Operations of Input Device 200)

Figure 14A:
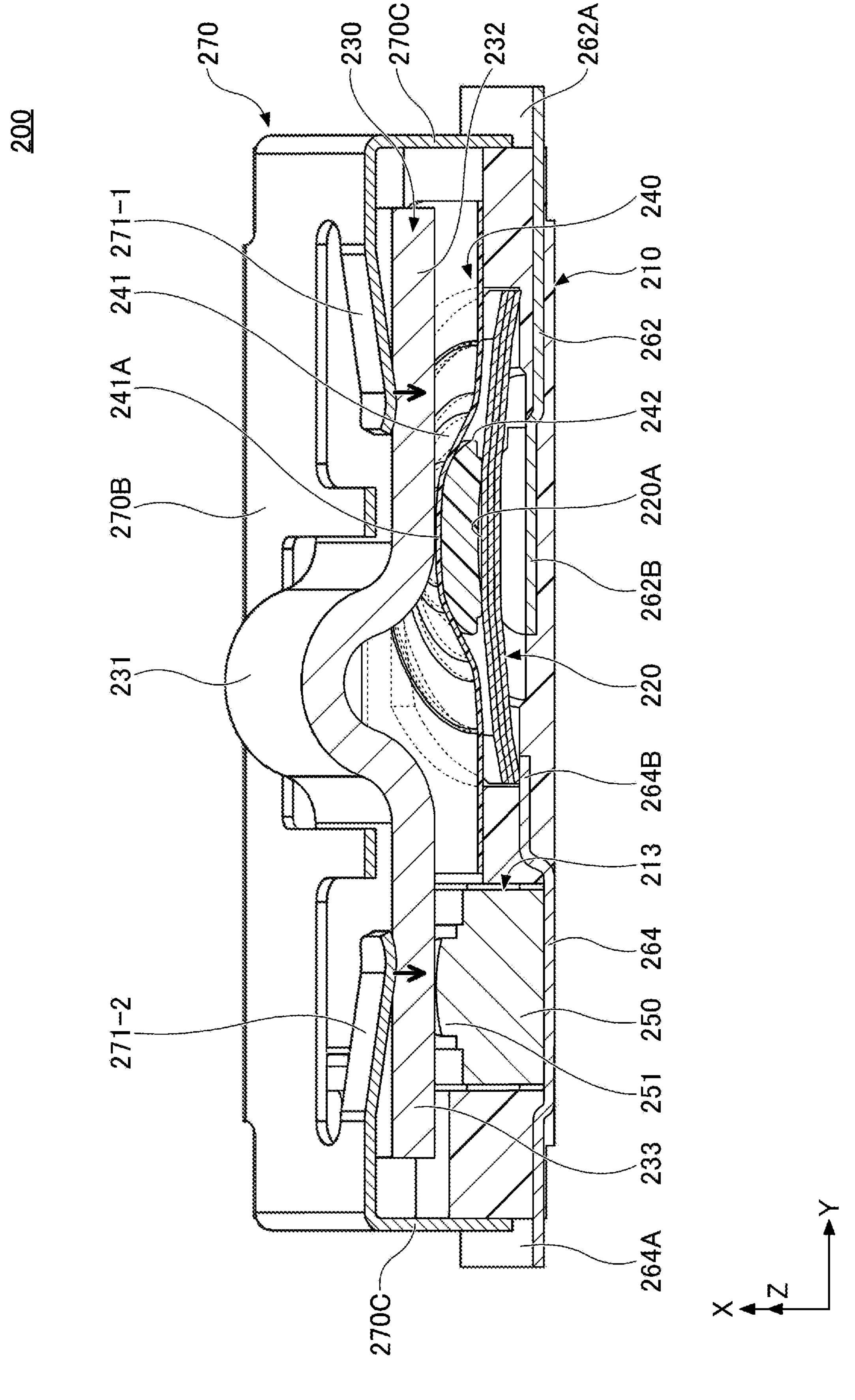
FIG. 14A is a diagram for describing operations of the input device according to the other embodiment.
Figure 14B:
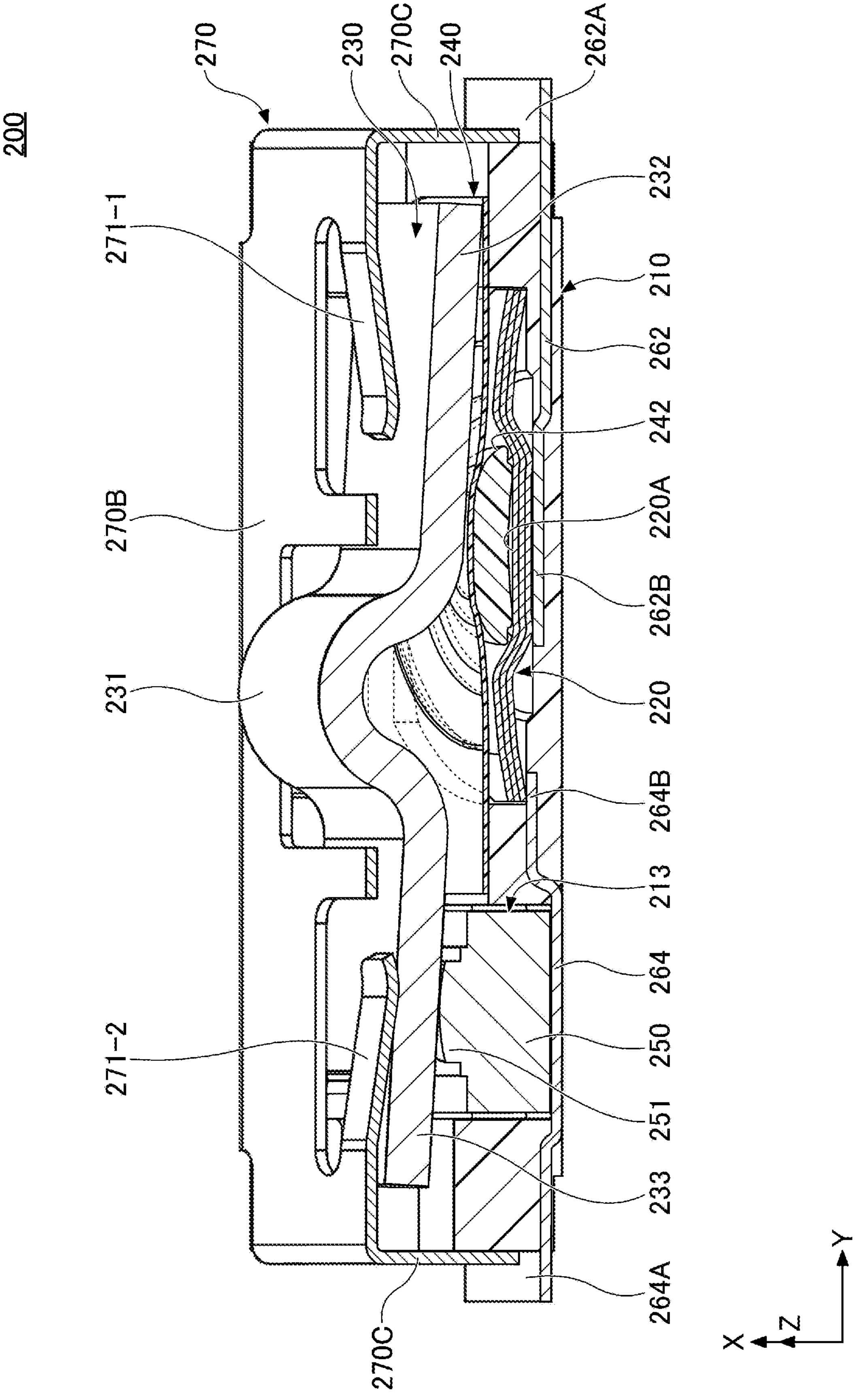
FIG. 14B is a diagram for describing operations of the input device according to the other embodiment.

The FIG. 14A and FIG. 14B are drawings for describing operations of the input device 200 according to the other embodiment.

<While There is No Pushing Operation>

As illustrated in FIG. 14A, while there is no pushing operation being performed on the operating portion 231 of the stem 230 in the input device 200 according to the other embodiment, the stem 230 is supported from below by the top portion 241A (and the top portion 220A of the invertible spring 220) of the bump portion 241 of the insulator 240 and the pushing portion 251 of the pressure sensor 250, thereby being kept horizontal.

Here, the stem 230 is pushed from above by the elastic arms 271-1 and 271-2 of the cover member 270, so as to be pressed against the top portion 241A of the bump portion 241 of the insulator 240 and the pushing portion 251 of the pressure sensor 250.

Accordingly, in the input device 200 according to other embodiment, any wobbling of the stem 230 in the first recessed portion 211 of the housing 210 in the input device 200 according to the other embodiment can be suppressed.

Also, since the input device 200 according to the other embodiment can always apply a constant load to the pushing portion 251 of the pressure sensor 250, a failure such as a disconnection can be detected by monitoring the output of the pressure sensor 250.

Also, since the pressure sensor 250 of the input device 200 according to other embodiment can be pressed against the bottom of the second accommodating area 213 of the housing 210, the input device 200 can suppress any wobbling of the pressure sensor 250 in the second accommodating area 213 of the housing 210.

<During the Pushing Operation>

As illustrated in FIG. 14B, when a pushing operation is performed on the operating portion 231 of the stem 230 in the input device 200 according to the embodiment, the stem 230 tilts downward on the fulcrum 233A that is the point of the stem 230 that is in contact with the pushing portion 251 of the pressure sensor 250, thereby causing the second pushing portion 233 of the stem 230 to push the pushing portion 251 of the pressure sensor 250 and causing the first pushing portion 232 of the stem 230 to push down the top portion 220A of the invertible spring 220 via the insulator 240 and the pushing body 242.

By doing so, the input device 200 according to the other embodiment can detect an operating load of the pushing operation in real time by the pressure sensor 250.

Also, once the operating load of the pushing operation exceeds a predetermined threshold, the top portion 220A of the invertible spring 220 rapidly performs an inverting operation. Thus, the input device 200 according to the other embodiment can impart a clicking sensation in response to the pushing operation.

Also, when the invertible spring 220 becomes inverted, the rear-side portion of the top portion 220A of the invertible spring 220 comes into contact with the first fixed contact 262B. By doing so, the input device 200 according to the other embodiment can perform a switching operation such that the first fixed contact 262B and the external connection terminal 262A become electrically connected (that is, in a switched-on state) with the second fixed contact 264B and the external connection terminal 264A, via the invertible spring 220.

Further, in the input device 200 according to the embodiment, when the pushing operation on the operating portion 231 of the stem 230 is ceased, the invertible spring 220 returns to its original convex shape owing to the elastic force of the invertible spring 220. By doing so, the rear-side portion of the top portion 220A of the invertible spring 220 ceases being in contact with the first fixed contact 262B. As a result, the input device 200 according to the other embodiment can perform a switching operation such that the first fixed contact 262B and the external connection terminal 262A cease being electrically connected (that is, enter a switched-off state) with the second fixed contact 264B and the external connection terminal 264A.

Therefore, according to the input device 200 of the embodiment, a clicking operation sensation can be imparted in response to the pushing operation and various detections (detection of a switching between the on state and the off state, and detection of an operating load) of the pushing operation can be performed with a relatively simple configuration.

(Configuration of Input Device 200)

Figure 15:
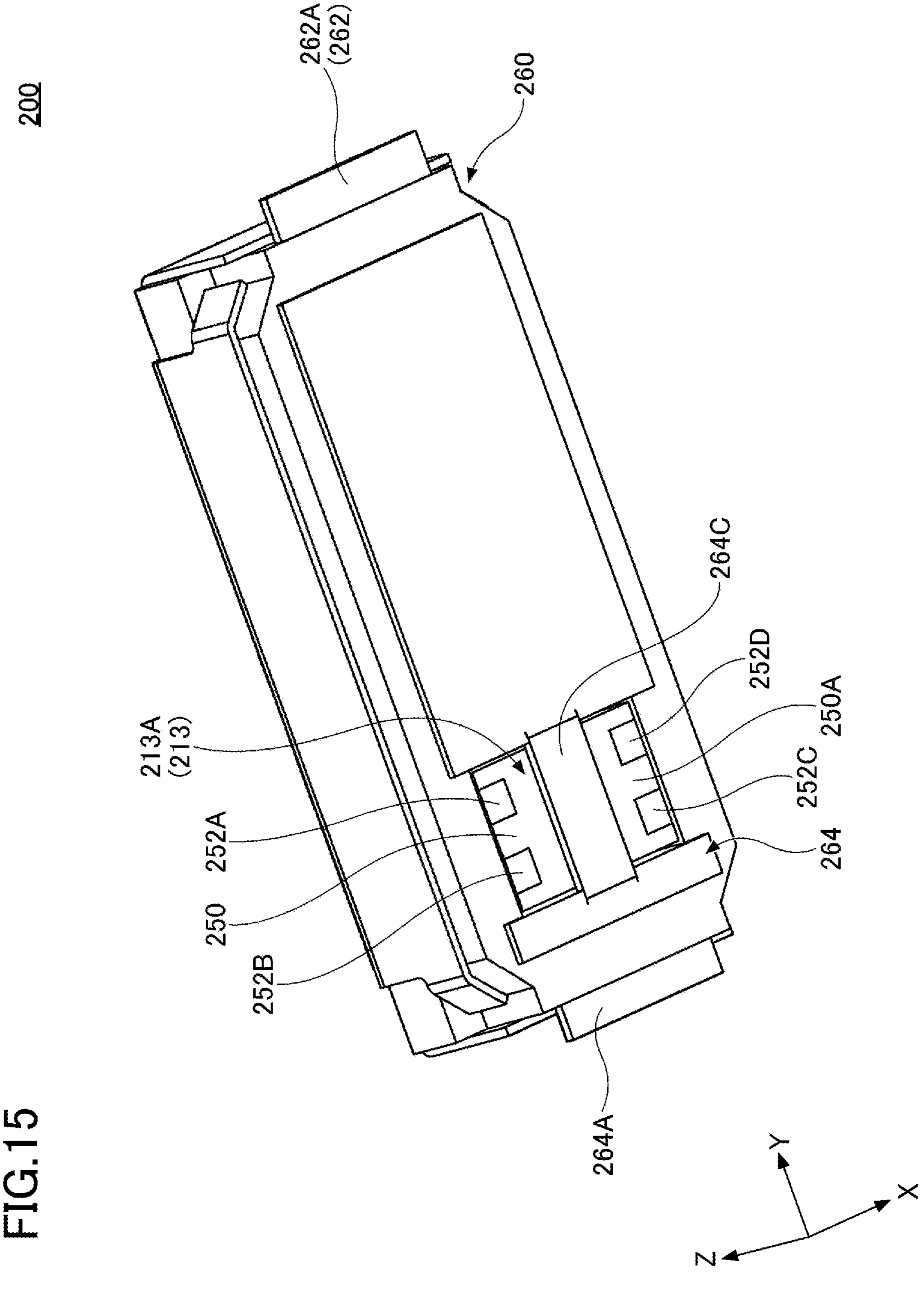
FIG. 15 is an external perspective view of the input device according to the other embodiment as viewed from the bottom surface of the input device.

FIG. 15 is an external perspective view of the input device 200 according to the other embodiment as viewed from the bottom side of the input device 200. As illustrated in FIG. 15, the bottom of the second accommodating area 213 of the housing 210 is an opening 213A. Also, the second fixed contact member 264 includes a narrow-width portion 264C which is narrower than other portions of the second fixed contact member 264 in the X-axis direction. The narrow-width portion is 264C provided so as to span the bottom of the second accommodating area 213 in the Y-axis direction. Accordingly, in the input device 200 according to the other embodiment, a bottom surface 250A of the pressure sensor 250 that is housed in the second accommodating area 213 can be supported by the narrow-width portion 264C of the second fixed contact member 264.

Also, the input device 200 according to the other embodiment is configured such that the narrow-width portion 264C of the second fixed contact member 264 spans a portion (the central portion in the X-axis direction) of the opening 213A. Thus, each of the four external connection terminals 252A, 252B, 252C, and 252D provided on the bottom surface 250A of the pressure sensor 250 can be exposed from the remaining portion (the portion where the narrow-width portion 264C is not provided) of the opening 213A. Therefore, in the input device 200 according to the other embodiment, when the input device 200 is mounted on a substrate, each of the external connection terminals 252A, 252B, 252C, and 252D can be easily connected to terminals on the substrate.

Although specific embodiments have been described above, the claimed subject matter is not limited to the above-described embodiments. Variations and modifications may be made without departing from the scope of the present invention.

What is claimed is:

1. An input device comprising:
- a housing;
- an invertible spring provided inside the housing;
- a load sensor arranged alongside the invertible spring inside the housing;
- a stem extending across a top portion of the invertible spring and the load sensor, and configured to push both the top portion of the invertible spring and the load sensor in response to an operating load applied to the stem; and
- a first fixed contact provided inside the housing,
- wherein the stem is a conductive member, and in response to the operating load applied to the stem, the stem pushes both the top portion of the invertible spring and the load sensor, and also comes into contact with the first fixed contact so that the first fixed contact is energized via the stem.

2. The input device according to claim 1, wherein
- the top portion of the invertible spring has an opening,
- the first fixed contact is provided under the invertible spring and is positioned so as to face the opening, and
- the stem includes a protrusion configured to pass through the opening of the invertible spring and come into contact with the first fixed contact when the invertible spring becomes inverted.

3. The input device according to claim 1, wherein the stem includes an operating portion to which the operating load is to be applied.

4. The input device according to claim 3, further comprising:
- a support provided in the housing, the support being configured to support the stem,
- wherein, in response to the operating load applied to operating portion, the stem tilts on the support acting as a fulcrum, thereby pushing the top portion of the invertible spring and pushing the load sensor.

5. The input device according to claim 4, wherein the operating portion is provided between the top portion of the invertible spring and the support in a first direction in which the top portion of the invertible spring and the support are arranged.

6. The input device according to claim 5, wherein, in the first direction, a ratio of a first distance to a second distance is 1:5, the first distance being a distance from the support to the operating portion, and the second distance being a distance from the support to the top portion of the invertible spring.

7. The input device according to claim 5, wherein the support includes a second fixed contact to which the stem is always connected, and in response to the operating load applied to the operating portion, the stem comes into contact with the first fixed contact, thereby electrically connecting the first fixed contact with the second fixed contact, via the stem.

8. The input device according to claim 5, wherein the stem includes a first pushing portion configured to push the top portion of the invertible spring, a second pushing portion configured to push the load sensor, and a fulcrum portion configured to be supported by the support, and the operating portion is within a triangular region demarcated by positions of the first pushing portion, the second pushing portion, and the fulcrum portion, when the stem is viewed in a plan view.

9. The input device according to claim 1, wherein in response to the operating load applied to the stem, the stem tilts on a fulcrum that is a point of the stem in contact with the top portion of the load sensor, thereby pushing both the top portion of the invertible spring and the load sensor.

10. The input device according to claim 9, further comprising:

a cover member that is provided over the stem, wherein the cover member includes an elastic arm that pushes the stem, thereby causing the stem to press against both the top portion of the invertible spring and the load sensor.

11. The input device according to claim 10, wherein the stem has an elongated shape, and includes a first pushing portion at one lengthwise end of the elongated shape and configured to push the top portion of the invertible spring, a second pushing portion at another lengthwise end of the elongated shape and configured to push the load sensor, and an operating portion to which the operating load is to be applied, the operating portion having a curved shape that is convex upward.

12. The input device according to claim 11, wherein the load sensor is housed in an accommodating area of the housing and by being subjected to a pushing force via the stem from the elastic arm, the load sensor is pressed against a bottom of the accommodating area so as to be fixed in place.

13. The input device according to claim 9, wherein the stem has an elongated shape, and includes a first pushing portion at one lengthwise end of the elongated shape and configured to push the top portion of the invertible spring, a second pushing portion at another lengthwise end of the elongated shape and configured to push the load sensor, and an operating portion to which the operating load is to be applied, the operating portion having a curved shape that is convex upward.

14. The input device according to claim 9, wherein the stem is formed of a hard material.

* * * * *